United States Patent [19]

North et al.

[11] 3,891,735

[45] June 24, 1975

[54] SINTERED ARTEFACTS AND THE LIKE

[75] Inventors: John Malcolm North; Ronald Spencer Wilks, both of Newbury, England

[73] Assignee: United Kingdom Atomic Energy Authority, London, England

[22] Filed: Dec. 27, 1972

[21] Appl. No.: 318,747

[30] Foreign Application Priority Data
Dec. 29, 1971 United Kingdom............ 60575/71

[52] U.S. Cl. .................. 264/59; 264/60; 264/63; 264/65; 264/219; 264/317; 264/DIG. 44
[51] Int. Cl............................................. C04b 35/64
[58] Field of Search .......... 264/59, 63, 65, 60, 219, 264/317, DIG. 44

[56] References Cited
UNITED STATES PATENTS

| | | |
|---|---|---|
| 2,448,930 | 9/1948 | Stokes................................ 264/59 |
| 3,112,184 | 11/1963 | Hollenbach.................... 264/317 X |
| 3,533,753 | 10/1970 | Berger............................. 264/59 X |
| 3,692,474 | 9/1972 | Arber.............................. 264/65 X |
| 3,695,960 | 10/1972 | Richter........................... 264/63 X |

Primary Examiner—Robert F. White
Assistant Examiner—Thomas P. Pavelko
Attorney, Agent, or Firm—Larson, Taylor & Hinds

[57] ABSTRACT

A fired refractory artefact with a fine matrix of apertures is manufactured by stacking layers of low ash paper with intervening layers of composite plastics material in sheets. The composite plastics material comprises powdered refractory material and a binder. The composite plastics material sheets are connected by ribs or walls of the composite plastics material formed, for example, in slots cut in the paper layers. The plastics material is cured and the artefact fired after burning off the paper.

2 Claims, 9 Drawing Figures

PATENTED JUN 24 1975 3,891,735

SHEET 1

SINTERED ARTEFACTS AND THE LIKE

The invention relates to sintered artefacts and like artefacts, the manufacture of which involves firing a refractory material.

The invention involves a method of manufacturing a sintered artefact or like artefact the manufacture of which involves firing a refractory material, which method comprises stacking layers of sheet material, (such as paper) capable of burning readily and without deleterious ash formation, with intervening layers of composite plastics material in sheets comprising powdered refractory material and a binder, providing ribs or walls of such composite plastics material for connecting together sheets thereof, heating the stack to cure the binder, further heating to burn off the burnable material, and firing the stack under conditions appropriate to form the sintered or like artefact from the powdered refractory material.

The invention includes a method of fabricating a component for use in the manufacture of sintered artefacts or like artefacts as aforesaid, which method comprises forming a sheet of paper, or like sheet material capable of burning readily and without deleterious ash formation, with slots corresponding to wanted structural features, such as ribs or walls, in a finished artefact, filling the slots with a mixture of powdered refractory material, a binder and a solvent for the binder, and evaporating the solvent.

Preferably the sheet of readily burnable material is secured to a support sheet with adhesive insoluble in the said solvent for the binder, the composite of sheet material being formed with the slots as aforesaid, a further support sheet is secured with adhesive insoluble in the said solvent for the binder to the slotted burnable material on the side remote from the slotted support sheet, whereby the slots become troughs, the troughs are filled with the mixture of powdered refractory material, binder and solvent, and, after the said solvent for the binder has evaporated, the support sheets are removed. This latter step may be achieved by soaking in a solvent for the said adhesive which is not a solvent for the said binder.

Preferably the troughs are filled with the mixture of powdered refractory material, binder and solvent by passing the composite of sheets through the mixture and under a doctor blade.

Preferably a plasticiser is included in the mix.

Conveniently the binder comprises both a thermoplastic and a thermosetting resin. The thermoplastic resin controls the initial formation and shaping and the thermosetting resin can be cured at higher temperatures (for example 100°C–200°C) thereby to impart rigidity at higher temperatures at which the thermoplastic resin is losing its strength. This facilitates the heat treatment required for burning off the burnable material and the resin binders prior to final firing to form the finished artefact.

It is preferred to use a binder which has thermoplastic and thermosetting properties such as polyvinyl butyral which is a thermoplastic but, when heated, for example to about 200°C, exhibits properties similar to a cured thermosetting resin.

In exercising a preferred method of manufacturing a sintered artefact or like artefact, according to the invention, and making use of the aforesaid sheet components, a stack of the sheet components is interleaved with plane continuous sheets of composite plastics material comprising powdered refractory material and binder, heat and pressure is applied to weld the layers of composite plastics material to the material in the slots of the sheet components, the stack is heated to cure the binder, further heated to burn off the burnable material, and the binder, and finally firing the stack under conditions appropriate to form the sintered or like artefact from the powdered refractory material.

The powdered refractory material may comprise powdered ceramic, cermet, metal, glass, glass-ceramic, or mixtures of these materials. A preferred starting material is silicon powder, which is fired in an atmosphere of nitrogen so that the final artefact comprises silicon nitride. Reference to firing refractory material is thus to be understood as including heat treatment under conditions, such as a specified atmosphere, under which the starting powdered material is converted into a different material in the finished artefact.

Embodiments of the invention will now be described by way of example and with reference to the accompanying drawings in which.

Figure 2:
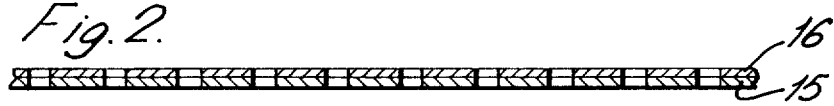
FIG. 2 is a diagrammatic cross-sectional view on the line II—II of FIG. 1.
Figure 3:
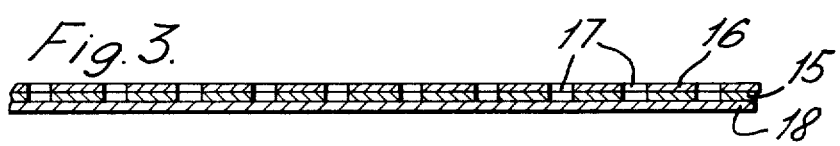
Figure 4:
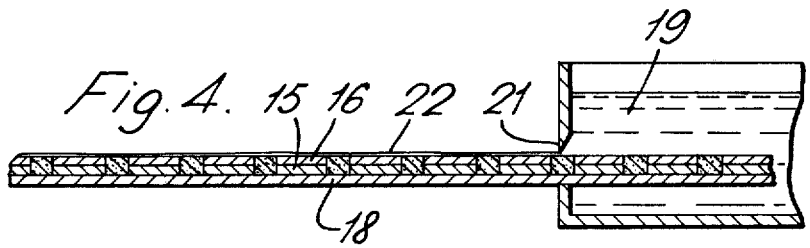
Figure 5:
Figure 6:
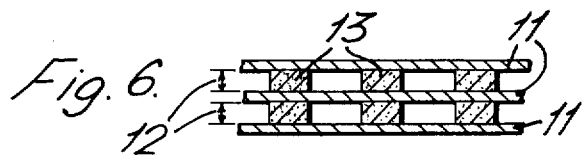
Figure 7:
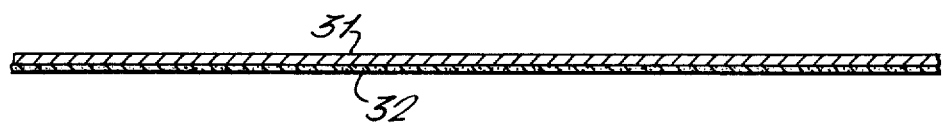
Figure 8:
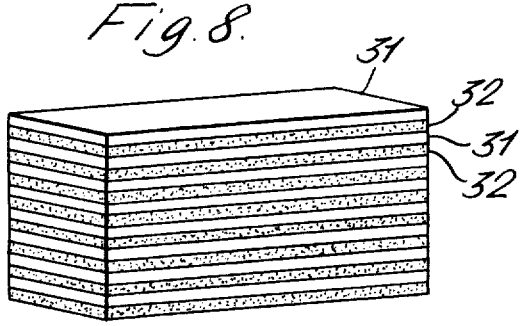
Figure 9:
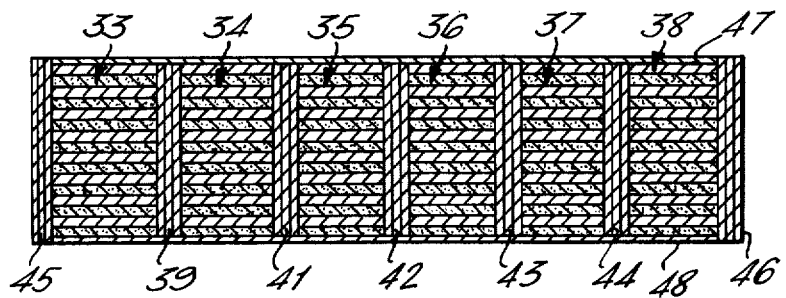

FIGS. 3, 4 and 5 are cross-sectional views, similar to FIG. 2, but showing successive stages in the manufacture of a component embodying the invention, FIG. 6 is a diagrammatic cross-sectional view of part of an artefact made using the component of FIG. 5, FIG. 7 is a diagrammatic cross-sectional view of a sandwich sheet of paper and adherent sheet of composite plastics material, FIG. 8 is a diagrammatic perspective view of a stack formed from slices of the sandwich sheet of FIG. 7, and FIG. 9 is a diagrammatic cross-sectional view of an artefact made from a plurality of stacks as shown in FIG. 8.

In the example of FIGS. 1 to 6, a thin-walled silicon nitride recuperator is made comprising a pack of 0.006 inch sheets 11 with 0.012 inch gaps 12 between them (see FIG. 6). Adjacent sheets 11 are separated by a pattern of 0.05 inch wide spacers 13.

The preliminary fabrication is based upon the use of a silicon-plastic material in the manner described in British Pat. Specification No. 1,274,211.

Figure 1:
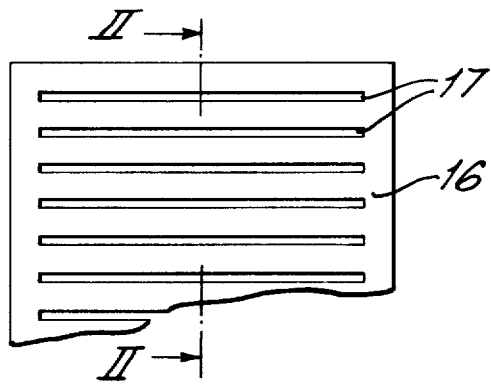
FIG. 1 is a plan view of a composite paper sheet.

In this example, to facilitate incorporation of the spacers 13, a component is first formed in which elements 14 of silicon-plastic material of the required size and shape for the spacers 13 are supported, at the required separation, on a paper sheet 15. The fabrication of this component is as follows:

One side of a sheet 15 of paper is covered with gummed brown paper tape 16 (see FIGS. 1 and 2). Slots 17 are cut through the composite of paper 15 and brown paper tape 16, the dimensions of the slots corresponding with the desired size and separation of the spacers 13. As may be seen from FIG. 1, the slots do not extend right across the paper sheet, so that the integrity of the sheet is maintained.

The side of the paper sheet 15 remote from that which is secured to the brown paper tape 16 is covered with a continuous sheet of gummed brown paper tape 18, so that the slots 17 form troughs.

The troughs are filled with silicon-plastic material by drawing the composite paper sheet through a slurry 19 of silicon powder, binder and solvent, under a doctor blade 21 set so that the face of the paper is given as thin a coating as possible.

A suitable mix for the slurry is as follows:

| | Percentage by weight: |
|---|---|
| Silicon, ball-milled or vibro-milled to a fine powder | 85 |
| Mixture of 4 parts by weight polyvinyl butyral and 3 parts by weight dibutyl phthalate plasticiser | 15 |

These components are thoroughly mixed using methyl ethyl ketone as solvent to form a slurry of consistency suitable for filling the troughs by the doctor blading technique. It will be appreciated that, for this step, it is important that the adhesive by which the brown paper tape is secured to the paper sheet 15 should not be soluble in the slurry 19.

After the methyl ethyl ketone has evaporated to leave the troughs filled with silicon-plastic material and a thin skin 22 of silicon-plastic over the upper layer 16 of slotted brown paper tape, the composite sheet is soaked in water to soften the adhesive on the brown paper tape. The brown paper tape 16 and 18 is then stripped from the two sides of the paper sheet 15. This leaves a component as shown in FIG. 5 comprising elements 14 of silicon-plastic material supported in the form of a continuous sheet on the paper 15. It will be noted that the elements 14 protrude from one side of the paper 15 by the thickness of the brown paper tape 16. The removal of the brown paper tape after the doctor blading operation leaves the paper 15 clean on both sides.

The component shown in FIG. 5 is used in the manufacture of the recuperator as follows:

Alternate layers of the sheet component shown in FIG. 5 and rolled 0.006 inch thick continuous silicon-plastic sheet are built into a pack and clamped under pressure. The continuous silicon-plastic sheet may be fabricated in the manner described in British Pat. Specification No. 1,274,211.

The pack is heated to 100°C for 12 hours to cause the elements 14 and sheet to weld together. The pack is then heated to 180°C for 24 hours to cure the binder. The sides of the cured pack are then trimmed, for example with a diamond impregnated slitting sheel and, if desired, further machining operations may be carried out, such as grinding, milling or drilling.

Finally the artefact is heated under controlled conditions, firstly to burn off the paper and vaporise the binder, and secondly, at a higher temperature in a nitrogen atmosphere, so that the silicon reacts with the atmosphere to form a silicon nitride artefact having the configuration illustrated by the part sectional view of FIG. 6.

It is important that the paper 15 should not damage the delicate silicon structure as it is burnt off. It has been found that with ordinary paper or thin cardboard, the curling of the ash during this "debonding" stage at 400°C tends to break the silicon structure. However, this difficulty has been avoided by using Whatman No. 3 filter paper, which produces little ash. To meet the fabrication conditions it is necessary to improve the wet strength of the filter paper, and this may be achieved by soaking the paper in a solution of polyvinyl butyral in ethanol and then allowing the ethanol to evaporate at room temperature.

A further improvement in the manufacture has been achieved by carrying out partial nitriding of the silicon prior to burning out of the paper. The procedure is to heat in air so as to burn out the binder but not sufficiently to burn the paper. The artefact is then heated in nitrogen to 1300°C followed by heating in air to 400°C to burn out the paper. The ash is then removed by washing with ultrasonic agitation followed by a conventional heat treatment in nitrogen up to 1450°C to complete conversion of the silicon to the silicon nitride. It has been found best to carry out the burning of the paper after partial nitriding rather than after final nitriding because of the formation of silicon nitride wiskers during the final nitriding stage. The combination of ash and wiskers is difficult to remove by ultrasonic washing, but separate treatment to remove ash and, subsequently, to remove wiskers has been found practicable.

In the example shown in FIGS. 7 to 9, a rectangular block recuperator is made comprising a matrix of rectangular apertures surrounded by thin silicon nitride walls.

A sandwich sheet (FIG. 7) of silicon-plastic material 31 on paper 32 is formed, for example by a doctor blading technique such as is described in British Pat. Specification No. 1,274,211. The sandwich sheet is sliced into strips which are stacked as illustrated in FIG. 8 to provide, in this example, alternate layers of paper 32 and siliconplastic material 31.

As shown in FIG. 9, six such stacks 33 to 38 are arranged side by side with intervening walls 39 to 44 and end walls 45 and 46. These walls comprise silicon-plastic material built, in this example, to adequate thickness by adjoining three layers of rolled silicon-plastic sheet 0.006 inch thick. Top and bottom of the structure are closed by walls 47, 48 of silicon-plastic material.

It is important that good adhesion is secured between the silicon-plastic material layers in the stacks 33 to 38 and the walls 39 to 46. It is also desirable for there to be good adhesion between the top and bottom walls 47, 48 and the walls 39 to 46.

The desired adhesion is achieved, for example, by applying heat and pressure to weld the silicon-plastic components together. Alternatively the parts may be painted with a little solvent before assembly, and then held under pressure until the solvent evaporates. Alternatively the parts may be painted with an adhesive which contains silicon powder and held under pressure until the adhesive sets.

The procedure for curing, debonding, partial nitriding, paper burn out, washing, final nitriding and washing to remove wiskers is as described for the example of FIGS. 1 to 6.

The invention is not restricted to the details of the foregoing examples. For instance, in the example of FIGS. 1 to 6, better pressure welding may be achieved when building a stack of sheets, if, prior to slotting, both sides of the low ash paper 15 are covered with removable brown paper, and slots cut right through this composite before applying a further layer of brown paper on one side. On subsequent removal of the brown paper, the elements of silicon plastic equivalent to 14 in FIG. 5 will protrude slightly on both sides of the sheet 15.

Further, in the example of FIGS. 7 to 9, the walls 39 to 44 and the end walls 45 and 46 need not necessarily be fabricated as shown but may, for example be made from single or double thickness of a thicker sheet material. Again, design requirements may be for thinner or thicker walls, and it will be appreciated that such requirements can readily be met by appropriate use or sandwiching of thin sheets.

We claim:

1. In a method of manufacturing a sintered artefact or like artefact the manufacture of which involves firing a refractory material, which method comprises stacking layers of sheet material capable of burning readily and without deleterious ash formation, with intervening layers of composite plastics material in preformed sheets comprising powdered refractory material and a binder which provides thermosetting properties, providing ribs or walls of composite plastics material and effecting bonding such that the ribs or walls connect together the sheets of composite plastics material, the thickness of the layers of burnable material defining the separation between adjacent sheets of composite plastics material, heating the stack to cure the binder, further heating to burn off the burnable material, and firing the stack to form the sintered or like artefact from the powdered refractory material, a method of fabricating a sheet component comprising securing a sheet of said readily burnable material to a support sheet with adhesive, forming said adhesively secured readily burnable sheet and support sheet with slots corresponding to wanted structural features in a finished aretfact, securing a further support sheet with adhesive to the slotted burnable sheet on the side remote from the slotted support sheet, whereby the slots become troughs, filling the troughs with a mixture of powdered refractory material, a binder capable of providing thermosetting properties and a solvent for the binder, evaporating the solvent, and removing the support sheets, the resultant composite plastics material comprising powdered refractory material and binder extending through the slots at least to the surface on each side of the slotted sheet of burnable material so as to form said ribs or walls, said adhesive being insoluble in said solvent for the binder.

2. A method as claimed in claim 1 wherein the troughs are filled with the mixture of powdered refractory material, binder and solvent by passing the composite of sheets through the mixture and under a doctor blade.

* * * * *